United States Patent [19]

Yamazaki

[11] Patent Number: 5,604,796
[45] Date of Patent: Feb. 18, 1997

[54] METHOD FOR AUTOMATICALLY CONTROLLING A CALL-WAITING-INTERRUPTION RESTRICTION AND SWITCHING SYSTEM

[75] Inventor: Yuki Yamazaki, Kawasaki, Japan

[73] Assignee: Fujitsu Limited, Kanagawa, Japan

[21] Appl. No.: 398,904

[22] Filed: Mar. 6, 1995

[30] Foreign Application Priority Data

Jun. 27, 1994 [JP] Japan .................................. 6-144242

[51] Int. Cl.⁶ .................................................. H04M 3/42
[52] U.S. Cl. ...................... 379/215; 379/201; 379/213; 379/93
[58] Field of Search .................................. 379/215, 207, 379/212, 213, 214, 98, 95, 93, 106, 107, 201, 211; 358/434

[56] References Cited

U.S. PATENT DOCUMENTS 5,327,488  7/1994  Garland ................... 379/246
5,425,092  6/1995  Quirk ...................... 379/201
5,432,616  7/1995  Fukao et al. ............. 358/434

FOREIGN PATENT DOCUMENTS 3-157043  7/1991  Japan .
4091546  3/1992  Japan .................... 379/215

Primary Examiner—Thomas W. Brown
Assistant Examiner—Parag Dharia

[57] ABSTRACT

In a method for automatically controlling a call-waiting-interruption restriction for a communication system, a subscriber is supplied with a call-waiting service permitting an interruption processing when an interruption call occurs. The subscriber is also supplied with a call-waiting-interruption restriction service for restricting the interruption processing even when the interruption call occurs. The interruption processing to the second subscriber is automatically restricted, when a first subscriber supplied with the call-waiting-interruption restriction service is in communication with a second subscriber supplied with the call-waiting service.

11 Claims, 16 Drawing Sheets

METHOD FOR AUTOMATICALLY CONTROLLING A CALL-WAITING-INTERRUPTION RESTRICTION AND SWITCHING SYSTEM

BACKGROUND OF THE INVENTION

1. Field of the Invention

The present invention generally relates to a call-waiting service, and more particularly, to a method for automatically controlling a call-waiting-interruption restriction and a switching system, which can automatically restrict a call-waiting-interruption for a one-side subscriber, when the other-side subscriber communicating with the one-side subscriber is supplied with a call-waiting-interruption restriction service.

2. Description of the Prior Art

A call-waiting service in speech signal communication is widely used by conventional subscribers. And further, data communication such as telematique services including a facsimile is also used by the conventional subscribers, so that the same subscriber is often supplied with both services of the speech signal communication and the data communication.

In this case, it is desired that the call-waiting service be supplied for the speech signal communication, whereas for the data communication, that a call-waiting-interruption by the call-waiting service be restricted to prevent communication data from being destroyed due to a beep sound for the call-waiting interruption being multiplied with the communication data. This way makes it possible to effectively utilize both the call-waiting and data communication services.

To restrict the interruption by the call-waiting service, a call-waiting-interruption restriction service (cancel-call-waiting service) is already in use. For the subscriber supplied with the cancel-call-waiting service, the call-waiting interruption coming from a third subscriber can be restricted during the communication. Therefore, this service can prevent the communication data from being destroyed due to the beep sound for the interruption.

Recently, a duplex ringing (DR) service is also being used. In the DR service, a subscriber connected to one subscriber line is supplied with a plurality of telephone numbers (two presently) with different kinds of calling-bell sounds. For example, a first telephone number is used for the speech signal communication, and a second telephone number is used for the facsimile.

Especially, when the DR service is supplied to the subscriber with the call-waiting service and the call-waiting-interruption restriction service, it is desired that the first telephone number be used for the speech signal communication and have the call-waiting service, and that the second telephone number be used for the facsimile and have the call-waiting-interruption restriction service. Information of the call-waiting service for the first telephone number, and information of the call-waiting-interruption restriction service for the second telephone number are stored in subscriber data associated with each telephone number.

In this case, when the interruption from the third subscriber to a first subscriber occurs, the call-waiting service is performed by referring to the subscriber data of the first subscriber. Therefore, even if the communication which has been started by terminating to the second telephone number is kept with the call-waiting-interruption restriction service, the interruption from the third subscriber may be accepted when the third subscriber has called to the first telephone number, which is supplied with the call-waiting service.

Therefore, when the communication is started by terminating to the second telephone number for the data communication, the call-waiting service is required to be restricted to prevent the communication data from being destroyed due to the beep sound for the interruption. To meet the requirement, when a call for the data communication terminates to the second telephone number, the call-waiting-interruption restriction service is performed by referring to the subscriber data for the second telephone number, and a restriction bit is set in a call-control memory to restrict an interruption call terminating to the first telephone number.

When the call for the data communication terminates to the first telephone number, the restriction bit is not set in the call-control memory, so that the call-waiting service may be performed by referring to the subscriber data of the first telephone number when the interruption call terminates to the first telephone number.

As described above, in the DR service, one subscriber can be simultaneously supplied with both the call-waiting service and the call-waiting-interruption restriction service.

However, in such a conventional call-waiting-interruption restriction service, the interruption call is only restricted for the subscriber supplied with this service. Therefore, even if this service is supplied to the first subscriber, the interruption call to a second subscriber as the opposite subscriber is not restricted when the second subscriber is supplied with the call-waiting service. Therefore, there is a problem that the communication data is destroyed due to the beep sound for the interruption call when the call-waiting-interruption is performed during the data communication such as telematique services.

On the other hand, another method to implement the data communication without the interruption is presented by an article shown in a Japanese Laid-Open Patent Application No. 3-157043. In this method, a device for discriminating the speech signal and the telematique signal is installed in a time-division switching system. And when the interruption call terminates to the subscriber supplied with the call-waiting service, that device monitors the signal within a communication line and discriminates whether the signal is the speech signal or the telematique signal. When the signal is discriminated to be the telematique signal, the call-waiting service is restricted.

However, if the opposite subscriber for the communication is supplied with the call-waiting service, the interruption call to the opposite subscriber cannot be restricted. The problem previously mentioned still remains. In addition, there is another problem that many devices for discriminating are required.

SUMMARY OF THE INVENTION

It is an object of this invention to provide a method for automatically controlling a call-waiting-interruption restriction and a switching system which can automatically restrict a call-waiting-interruption for a one-side subscriber, when the other-side subscriber communicating with the one-side subscriber is supplied with a call-waiting-interruption restriction service, in which the disadvantages described above are eliminated.

A more specific object of the present invention is to surely perform data communication such as telematique services while preventing communication data from being destroyed.

The object described above is achieved by a method for automatically controlling a call-waiting-interruption restriction in a communication system in which a subscriber can be supplied with a call-waiting service permitting an interruption processing when an interruption call occurs and a call-waiting-interruption restriction service restricting the interruption processing even when the interruption call occurs, the method comprising the step of: restricting automatically, when a first subscriber supplied with the call-waiting-interruption restriction service has communication with a second subscriber supplied with the call-waiting service, the interruption processing to the second subscriber.

The object described above is also achieved by the method as mentioned above, wherein the method further comprises the steps of: (a) setting an interruption-restriction flag in an information part for the first subscriber of a call-control memory, and setting the interruption restriction flag in the information part for the second subscriber of the call-control memory; and (b) referring to the interruption-restriction flag for the subscriber to whom the interruption call occurs, and restricting, if the interruption-restriction flag is set, the interruption processing; wherein the call-waiting service is automatically restricted for not only the first subscriber but also the second subscriber.

The object described above is further achieved by the method as mentioned above, wherein, the method further comprises the steps of: (c) setting an interruption-restriction flag in an information part for the first subscriber of a call-control memory within a first office to which the first subscriber belongs; and (d) transmitting information for the call-waiting-interruption restriction service of the first subscriber from the first office to a second office to which the second subscriber belongs by using an ACM message of the No. 7 common channel signaling method; wherein the call-waiting service is automatically restricted for not only the first subscriber but also the second subscriber in another office.

The object described above is further achieved by a switching system for making a transmission path between subscribers in a communication system in which a subscriber can be supplied with a call-waiting service permitting an interruption processing when an interruption call occurs and a call-waiting-interruption restriction service restricting the interruption processing even when the interruption call occurs, the system comprising: a switch connecting subscribers to establish communications; a call-processor, which is connected with the switch, controlling the switch to restrict automatically, when a first subscriber supplied with the call-waiting-interruption restriction service has communication with a second subscriber supplied with the call-waiting service, the interruption processing to the second subscriber.

According to the method for automatically controlling the call-waiting-interruption restriction, when the first subscriber and the second subscriber belong to the same office, and the first subscriber who is supplied with the call-waiting-interruption restriction service communicates with the second subscriber who is supplied with the call-waiting service, the interruption-restriction flag is set not only in the information part for the first subscriber of the call-control memory, but also in the information part for the second subscriber thereof. Thereby, the call-waiting-interruption is automatically restricted for the second subscriber who is supplied with the call-waiting service.

And according to the method for automatically controlling the call-waiting-interruption restriction, when the first subscriber belongs to a different office from an office to which the second subscriber belongs, and the first subscriber who is supplied with the call-waiting-interruption restriction service communicates with the second subscriber who is supplied with the call-waiting service, the identification flag for indicating the interruption restriction is set on the ACM message in the first office, and is transmitted to the second office. In the second office, the interruption-restriction flag is set in the information part for the second subscriber of the call-control memory, based on the identification flag on the ACM message transmitted from the first office. Thereby, the call-waiting-interruption is automatically restricted for the second subscriber who is supplied with the call-waiting service.

Therefore, according to the present invention, even if the second subscriber is supplied with the call-waiting service, the call-waiting interruption for the second subscriber is automatically restricted, so that it can prevent the communication data during the data communication such as telematique services from being destroyed due to a beep sound for an interruption call.

Other objects and further features of the present invention will be apparent from the following detailed description when read in conjunction with the accompanying drawings.

BRIEF DESCRIPTION OF THE DRAWINGS

FIG. 11A shows a communicating condition between a subscriber A and a subscriber B, FIG. 11B shows an interrupting condition of a subscriber C to the subscriber A, and FIG. 11C shows a communicating condition between the subscriber A and the subscriber C;

FIG. 12A shows the communicating condition between the subscriber A and the subscriber B, and FIG. 12B shows an interrupting condition of the subscriber C to the subscriber A;

DESCRIPTION OF THE PREFERRED EMBODIMENTS

Figure 1:
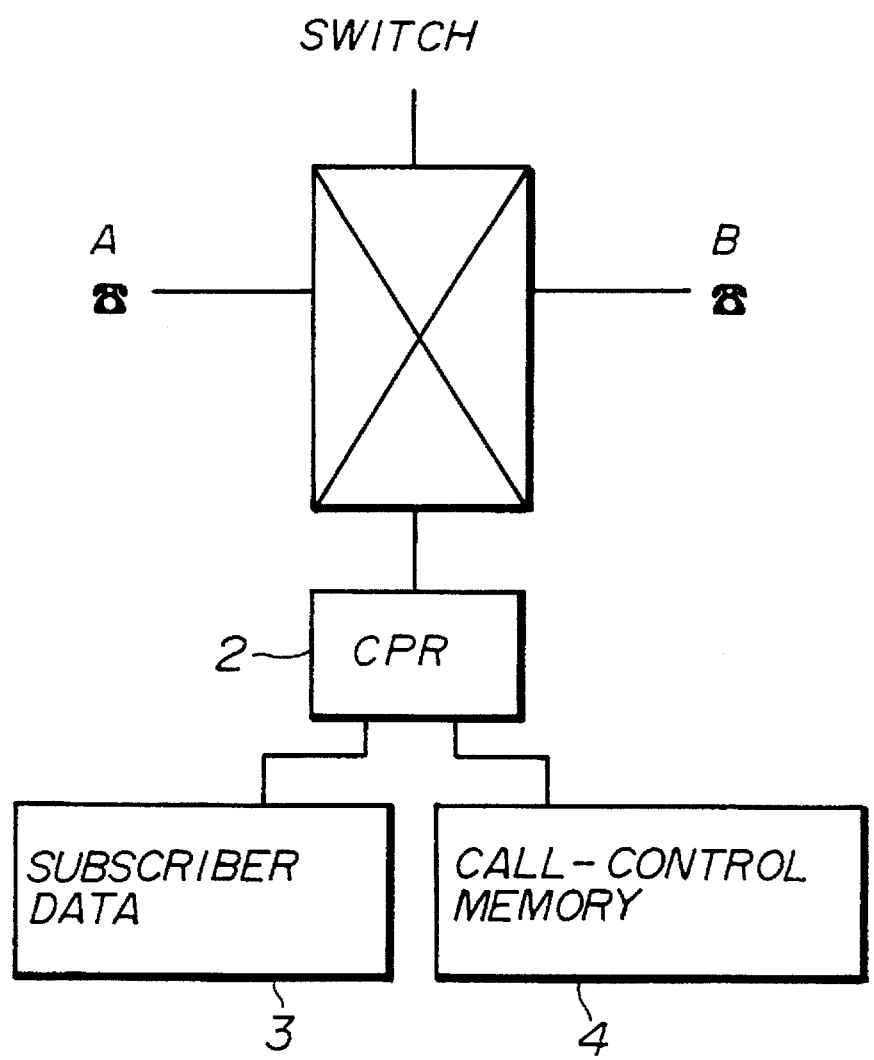
FIG. 1 shows a basic configuration for explaining the present invention.

First, a description will be given of a principle of a method for automatically controlling a call-waiting-interruption restriction according to the present invention, by referring to FIGS. 1 and 2. FIG. 1 shows a basic configuration for explaining the present invention. In this configuration, a subscriber A and a subscriber B belong to the same office, and the subscriber A can communicate with the subscriber B only by connection to a switch 1. A call processor (CPR) 2 is connected with the switch 1 for controlling calls.

Figure 3:
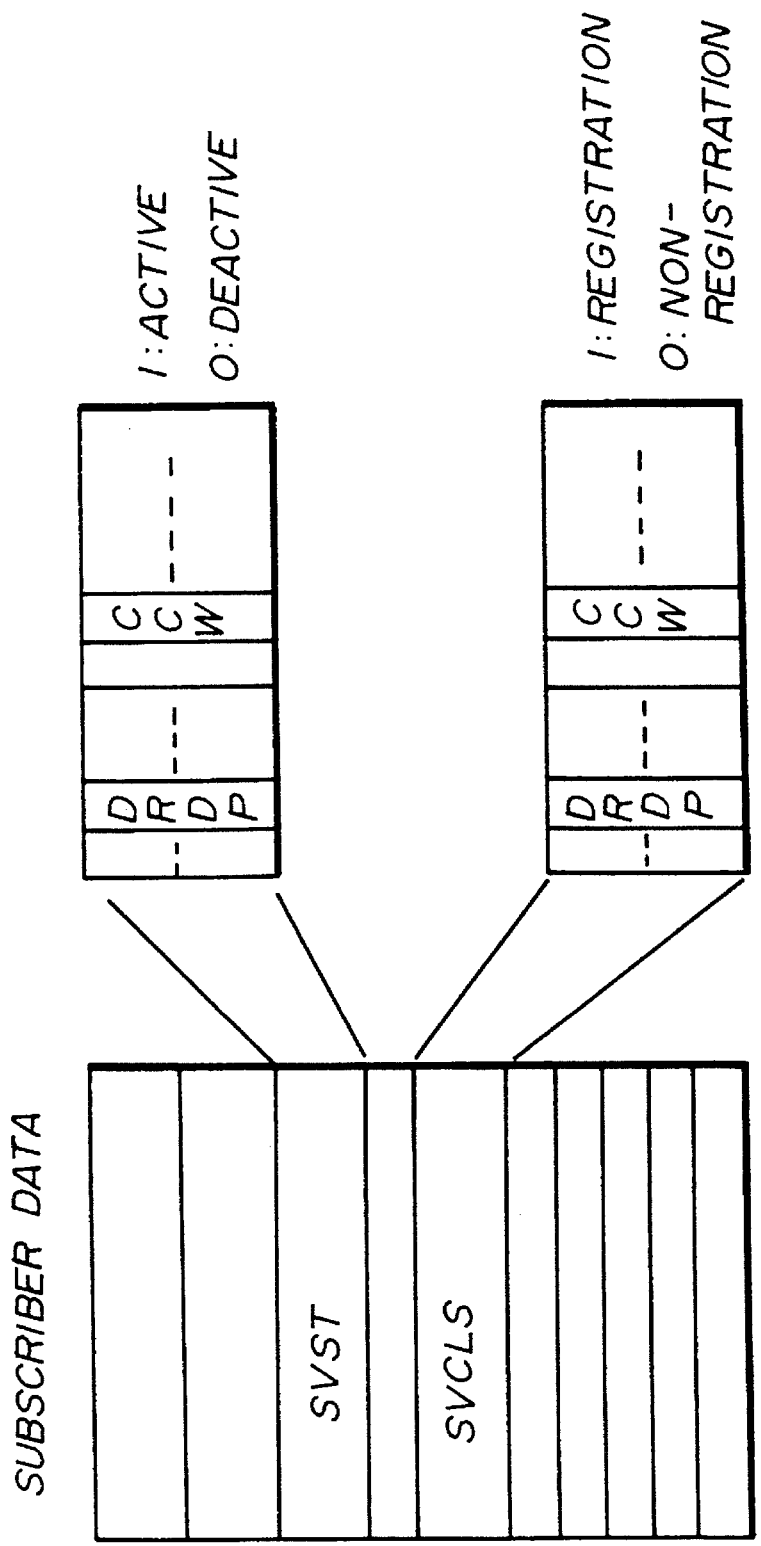
FIG. 3 shows an example of a data format of the subscriber data.

Subscriber data 3 which registers services for each subscriber is set in a file memory (not shown) which is accompanied with the CPR 2. FIG. 3 shows an example of a data format of the subscriber data 3. The data format is shown in FIG. 3 includes service status (SVSI) data and service class (SVCLS) data. The SVST data indicates whether each service is active or not, and SVCLS data indicate whether each service is registered for the subscriber. The SVST data and the SVCLS data includes a number of bits for a variety of services, such as the cancel-call-waiting service (CCW). With respect to, for example, the CCW bit, a bit "1" (or "0") in the SVCLS indicates that the CCW is registered (or not registered) for the subscriber, and a bit "1" (or "0") in the SVST indicates that the CCW is activated (or deactivated). A DRDP bit is a duplex-ringing-data-protection bit, and is used for this call-waiting-interruption restriction automatic-control service. It should be noted that, in this description and claims a representation "a subscriber is supplied with a service" indicates that "the service is registered to the subscriber and is also in an active condition for the subscriber".

Figure 4:
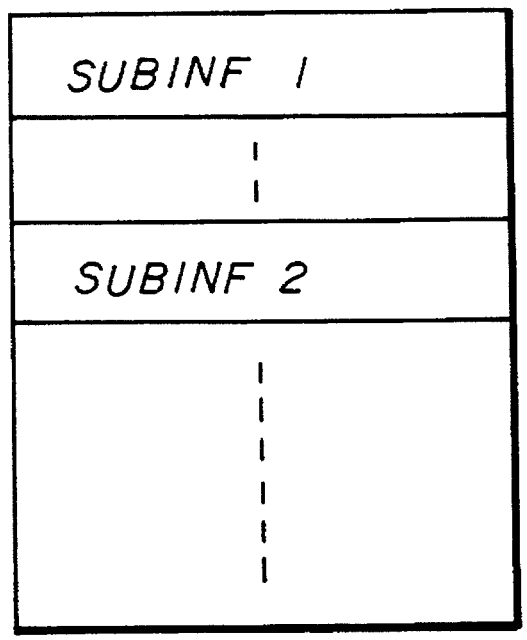
FIG. 4 shows an example of a data format of the call-control memory.

Further, the CPR 2 has also a call-control memory 4 in a main memory (not shown) accompanied with the CPR 2. FIG. 4 shows an example of a data format of the call-control memory 4. SUBINF data indicates subscriber information. In the call-control memory 4, the subscriber information such as necessary flags and indicators is set for each subscriber and each call. In a case of an intra-office call, the call-control memories for the subscriber A and the subscriber B exist in the same call-control memory 4.

In this configuration, the method for automatically controlling the call-waiting-interruption restriction is realized by procedures as follows.

1. If the subscriber B is supplied with a call-waiting-interruption restriction service, a identification flag for indicating the supply of the call-waiting-interruption restriction service is set in the subscriber data 3 of the subscriber B.

2. When the subscriber B receives a call from the subscriber A who is supplied with a call-waiting service, the supply of the call-waiting-interruption restriction service for the subscriber B is examined by referring to the subscriber data 3 of the subscriber B.

3. If the identification flag has been set in the subscriber data 3 of the subscriber B, an interruption-restriction flag for restricting a call-waiting interruption is set in a part for the subscriber B of the call-control memory 4.

4. And subsequently, an interruption-restriction flag for restricting the call-waiting interruption to the subscriber A is set in a part of the subscriber A of the call-control memory 4.

5. When the call-waiting-interruption for either of the subscriber A and the subscriber B occurs during the communication, the interruption-restriction flags for the subscriber A or the subscriber B are examined, and a busy-tone signal is returned back to one who has caused the call-waiting-interruption.

6. When the call between the subscriber A and the subscriber B is completed, the interruption-restriction flags for the subscriber A and the subscriber B are removed from the call-control memory 4.

In this way, even if the subscriber A is supplied with the call-waiting service, the call-waiting interruption to the subscriber A is automatically restricted.

Figure 2:
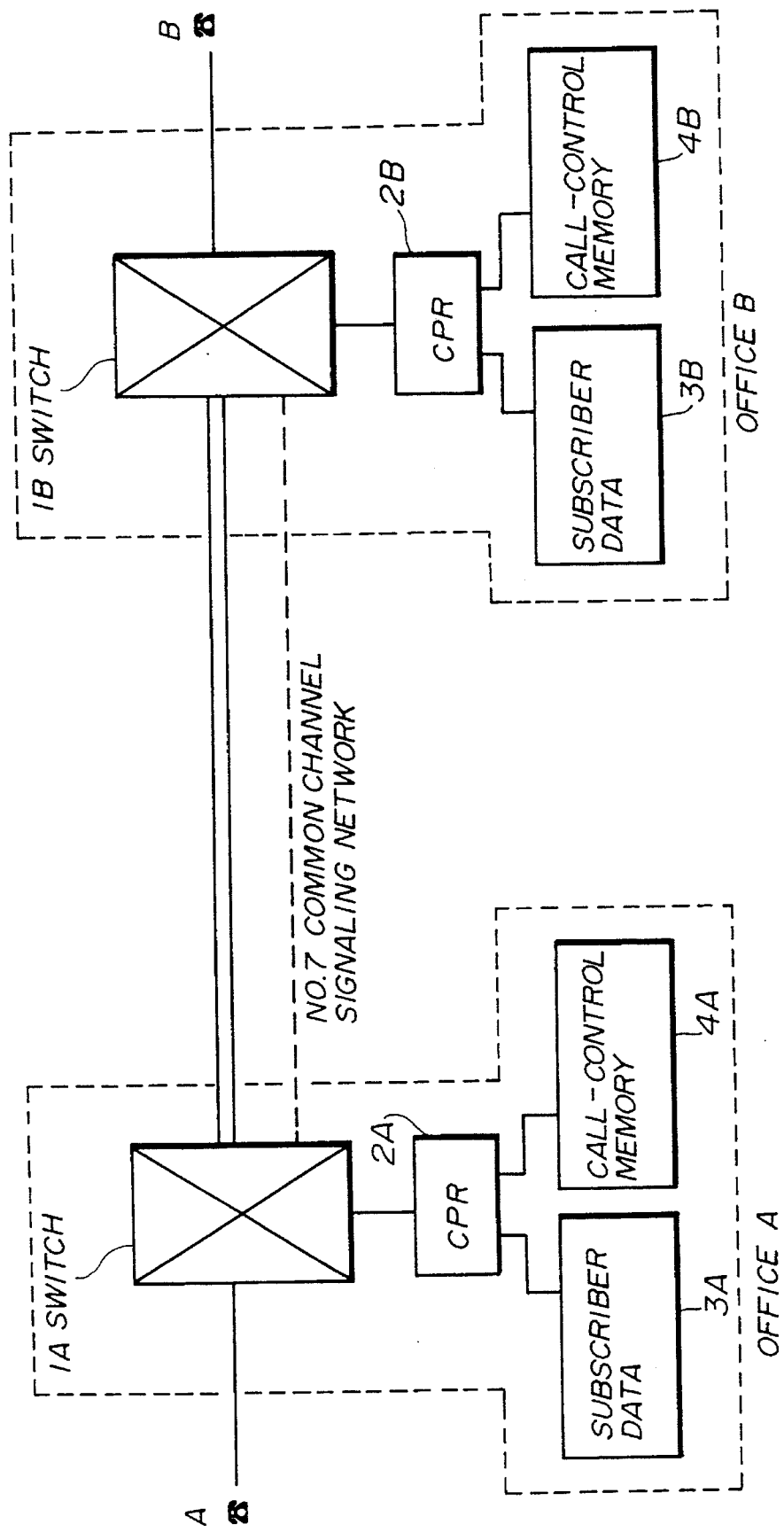
FIG. 2 shows another basic configuration for explaining the present invention.

FIG. 2 shows another basic configuration for explaining the present invention. In this configuration, the subscriber A and the subscriber B belong to each of different offices, an office A and an office B, and the subscriber A can communicate with the subscriber B by connecting a switch 1A in the office A with a switch 1B in the office B. A call-control signal of the switch 1A is transmitted to the switch 1B via a No. 7 common-channel signaling network, and vice versa. In the same manner mentioned above by referring to FIG. 1, a call processor (CPR) 2A with a subscriber data 3A and a call-control memory 4A is connected with the switch 1A. And a CPR 2B with a subscriber data 3B and a call-control memory 4B is connected with the switch 1B. The flags for the subscriber A should be set in the call-control memory 4A, and the flags for the subscriber B should be set in the call-control memory 4B.

In this configuration, the method for automatically controlling the call-waiting-interruption restriction is realized by procedures as follows.

1. If the subscriber B is supplied with the call-waiting-interruption restriction service, the identification flag for indicating the supply of the call-waiting-interruption restriction service is set in the subscriber data 3B of the subscriber B.

2. When the subscriber B receives the call from the subscriber A who is supplied with the call-waiting service, the supply of the call-waiting-interruption restriction service for the subscriber B is examined by referring to the subscriber data 3B of the subscriber B.

3. If the identification flag has been set in the subscriber data 3B of the subscriber B, the interruption-restriction flag for restricting the call-waiting interruption is set in a part for the subscriber B of the call-control memory 4B.

4. And subsequently, the identification flag, indicating that the subscriber B is supplied with the call-waiting-interruption restriction service, is set on an address complete message (ACM) of the No. 7 common-channel signaling network (which is defined in CCITT recommendation), and is transmitted to the switch 1A.

5. In the switch 1A, when the ACM which is set with the identification flag is received, the interruption-restriction flag for restricting the call-waiting interruption to the subscriber A is set in a part of the subscriber A of the call-control memory 4A.

6. When the call-waiting-interruption for either of the subscriber A and the subscriber B occurs during the communication, the interruption-restriction flags of the subscriber A and the subscriber B are examined, and the busy-tone signal is returned back to the one who has caused the call-waiting-interruption.

7. When the call between the subscriber A and the subscriber B is completed, the interruption-restriction flags of the subscriber A and the subscriber B are removed from the call-control memories 4A and 4B, respectively.

Therefore, even if the subscriber A is supplied with the call-waiting service, the call-waiting interruption to the subscriber A is automatically restricted.

Figure 5:
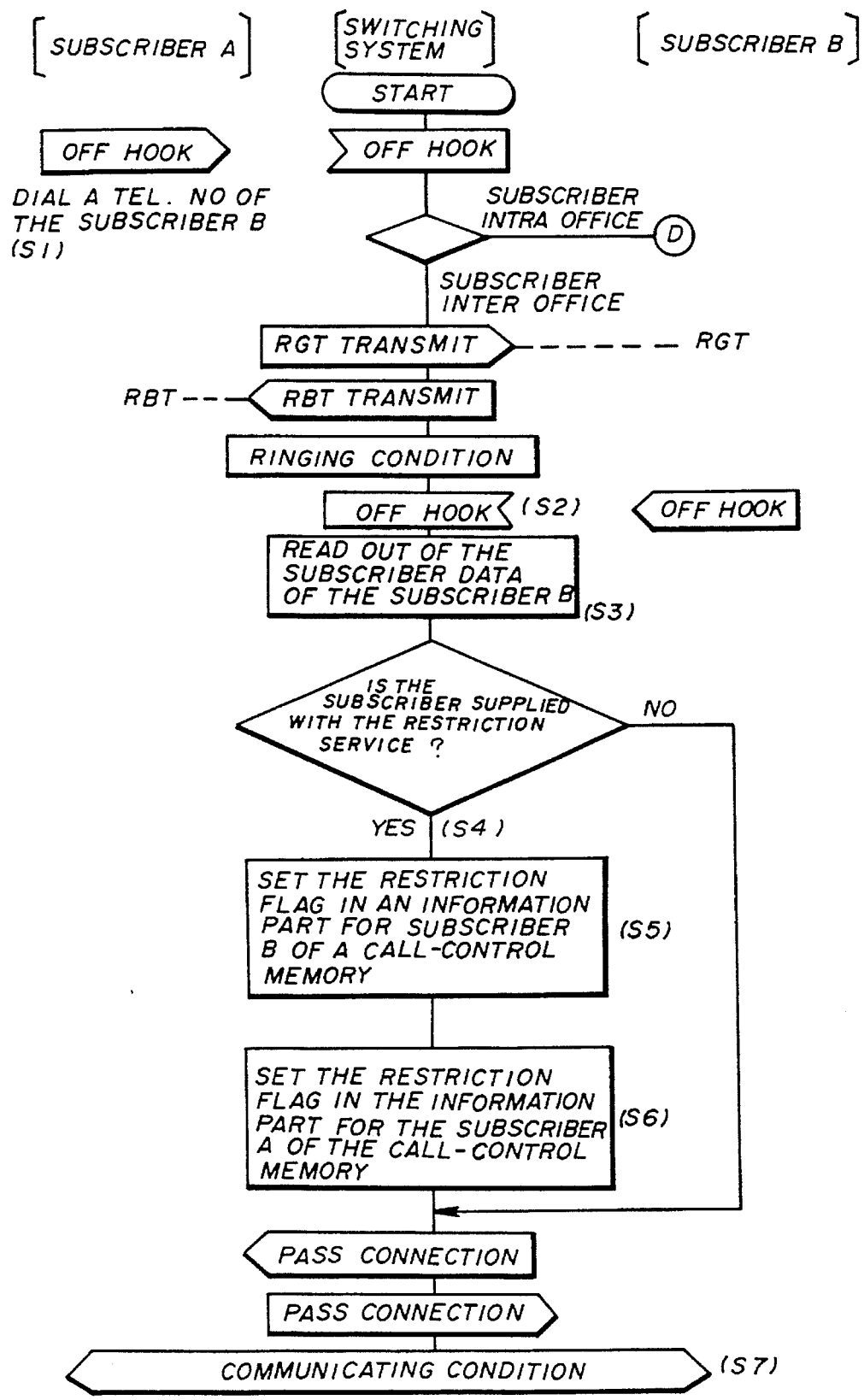
FIG. 5 shows an example of a procedure of a method for automatically controlling a call-waiting-interruption restriction in a case of intra-office communication according to the present invention.

Next, a detailed description will be given of a first embodiment of the method for automatically controlling the call-waiting-interruption restriction according to the present invention, by referring to FIG. 5. FIG. 5 shows an example of a procedure of the method for automatically controlling the call-waiting-interruption restriction in a case of the intra-office communication according to the present invention.

The procedure that data communication between the subscriber A and the subscriber B is performed will be discussed below on the assumption that the subscriber A and the subscriber B belong to the same office.

First, the subscriber A off-hooks his handset and dials a telephone number of the subscriber B who is supplied with the call-waiting service (step S1). A ringing tone (RGT) for calling the subscriber B is transmitted to the subscriber B, and a ring-back tone (RBT) for indicating termination at the subscriber B is transmitted to the subscriber A, so that the switching system is in ringing condition.

When the switching system receives an event of off-hook (OFFHOOK) of the subscriber B (step S2), the switching system reads out the subscriber data of the subscriber B (step S3), and examines whether the subscriber B is supplied with the call-waiting-interruption restriction service (step S4).

If the subscriber B is supplied with the call-waiting-interruption restriction service, the interruption-restriction flag is set in an information part for the subscriber B of the call-control memory (step S5).

And the interruption-restriction flag is also set in the information part for the subscriber A of the call-control memory (step S6).

After that, a request for pass connection is provided for the subscriber A and the subscriber B. When the pass connection is completed, the switching system is in a communicating condition (step S7).

In this embodiment, upon taking a off-hook signal from the subscriber B, the call-waiting interruption is fully automatically restricted for both the subscriber A and the subscriber B. Therefore, complicated procedures are unnecessary, such as that of the subscriber requesting this service to the switching system by using a specified access code, or of one inputting a specified command to the switching system for performing this service.

Figure 6:
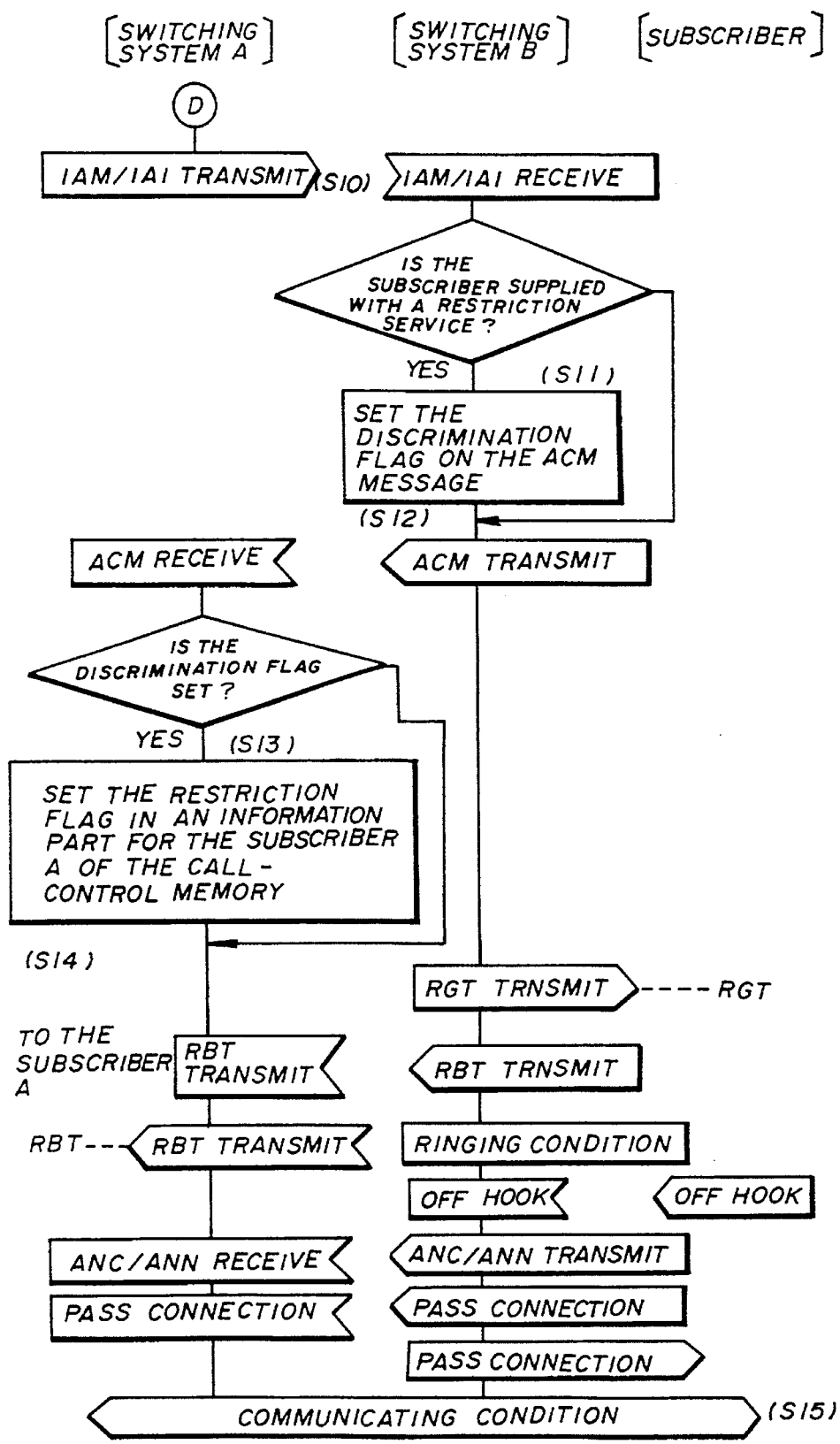
FIG. 6 shows an example of a procedure of the method for automatically controlling the call-waiting-interruption restriction in a case of inter-office communication according to the present invention.

Next, a detailed description will be given of a second embodiment of the method for automatically controlling the call-waiting-interruption restriction according to the present invention, by referring to FIG. 6. FIG. 6 shows an example of a procedure of the method for automatically controlling the call-waiting-interruption restriction in a case of inter-offices communication according to the present invention.

The procedure that the data communication between the subscriber A and the subscriber B is performed will be discussed below on the assumption that the subscriber A and the subscriber B belong to each of different offices, the office A and the office B, respectively. In the office A, a switching system A is located, and in the office B, a switching system B is located.

When the switching system A is connected with the switching system B through an intra-line such as a telephone-use part (TUP) signal or an ISDN user part (ISUP) signal on the No. 7 common-channel signaling method, first an initial address message (IAM) signal or an initial address message with additional information (IAI) signal is transmitted from the switching system A to the switching system B, after the off-hook and the dialing by the subscriber A (step S10).

When the switching system B receives the IAM signal or the IAI signal, the subscriber data for the subscriber B is read out to examine whether the subscriber B in the office B is supplied with the call-waiting-interruption restriction service (step S11).

In the office B, when the subscriber B is supplied with the call-waiting-interruption restriction service, the discriminating flag which indicates the supply of the restriction service is set on the ACM message, during processing of the ACM message (step S2).

If the intra-line is connected by the TUP signal, any of bit F, G, H (which are available for a national use) of the ACM message may be used for a bit of the identification flag.

In addition, if the intra-line is connected by the ISUP signal, any of bit E to H (which are available for a national use) of an optional backward call indicators of the ACM message may be used for the bit of the identification flag.

The ACM message is transmitted from the switching system B to the switching system A.

When the switching system A receives the ACM message, the identification flag on the ACM message is examined (step S13). If the identification flag is set on the ACM message, the interruption-restriction flag is set in the information part for the subscriber A of the call-control memory in the office A (step S14).

Next, from the switching system B, the ringing tone and the ring-back tone are transmitted to the subscriber B and to the switching system A, respectively, and the switching system B is in the ringing condition for the subscriber B. When the switching system B receives the event of the off-hook from the subscriber B, an answer-signal-and-charge (ANC) signal or an answer-signal-and-no-charge (ANN) signal is transmitted from the switching system B to the switching system A in response to the event. Further, the request of the pass connection is presented from the switching system B to the subscriber A and the subscriber B, and thus the system is in the communicating condition (step S15).

In this way, in the second embodiment, upon taking the off-hook signal from the subscriber A, the call-waiting-interruption is fully automatically restricted for the subscriber A. Therefore, the complicated procedures are also unnecessary, such as that of the subscriber requesting this service to the switching system by using the specified access code, or of the one inputting the specified command to the switching system for performing this service.

Figure 7:
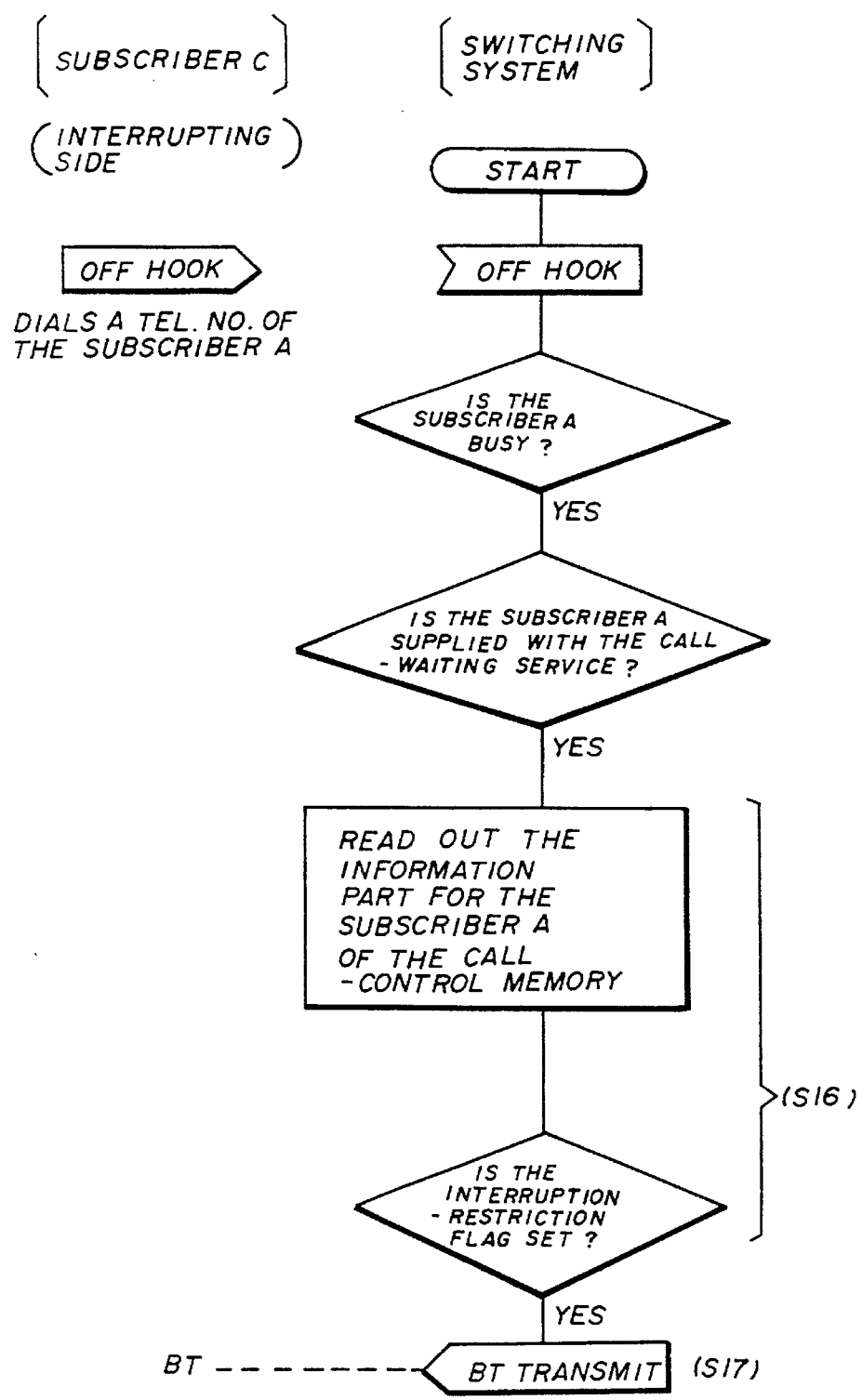
FIG. 7 shows an example of an interruption process of the method for automatically controlling the call-waiting-interruption restriction according to the present invention.

Next, a description will be given of a third embodiment of the method for automatically controlling the call-waiting-interruption restriction according to the present invention, by referring to FIG. 7. FIG. 7 shows an example of an interruption process of the method for automatically controlling the call-waiting-interruption restriction according to the present invention.

When a subscriber C dials a telephone number of the subscriber A during the communication between the subscriber A and the subscriber B (the call-waiting interruption occurs), the subscriber A is in a busy condition, and a supply of the call-waiting service is examined. If the call-waiting service is supplied to the subscriber A, the information part for the subscriber A of the call-control memory is read out to examine whether the interruption-restriction flag is set (step S16). If the interruption-restriction flag is set, the busy tone is returned back to the subscriber C (step S17). In this way, the call-waiting interruption is restricted.

Figure 8:
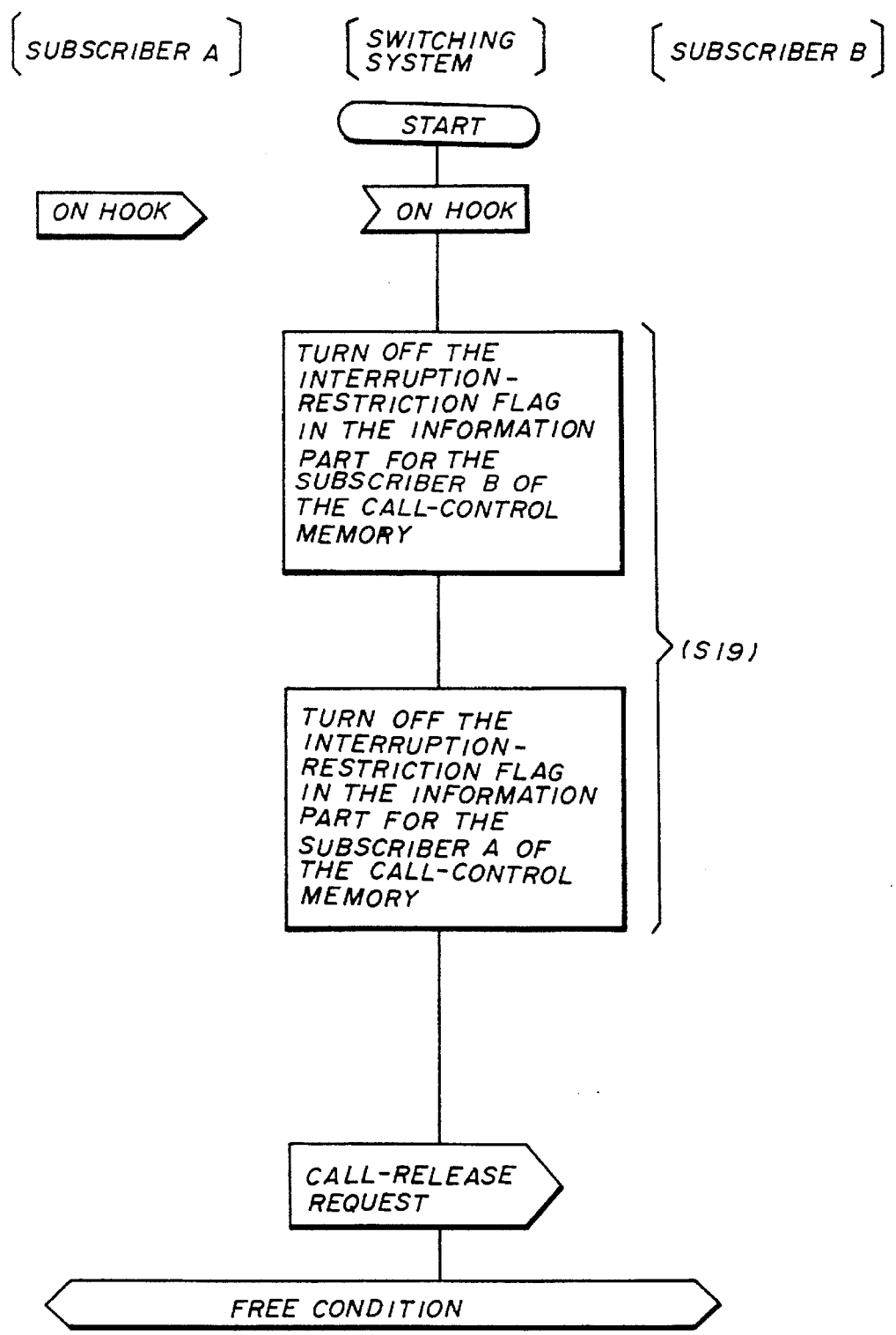
FIG. 8 shows an example of a call-completion process of the method for automatically controlling the call-waiting-interruption restriction according to the present invention.

Next, a description will be given of a fourth embodiment of the method for automatically controlling the call-waiting-interruption restriction according to the present invention, by referring to FIG. 8. FIG. 8 shows an example of a call-completion process of the method for automatically controlling the call-waiting-interruption restriction according to the present invention.

When the switching system receives an event of on-hook (ONHOOK) from the subscriber A, the interruption-restriction flags in both information parts for the subscriber A and the subscriber B of the call-control memory are removed (step S19). After that, a call-release request is sent to the subscriber B to make the system a free condition.

In this way, when the call is completed, the flags for restricting the interruption to the subscriber A and the subscriber B are removed. Therefore, after the call completion, the system returns to a condition supplying the call-waiting service, namely the system is automatically returned to a normal condition permitting the call-waiting interruption.

Figure 9:
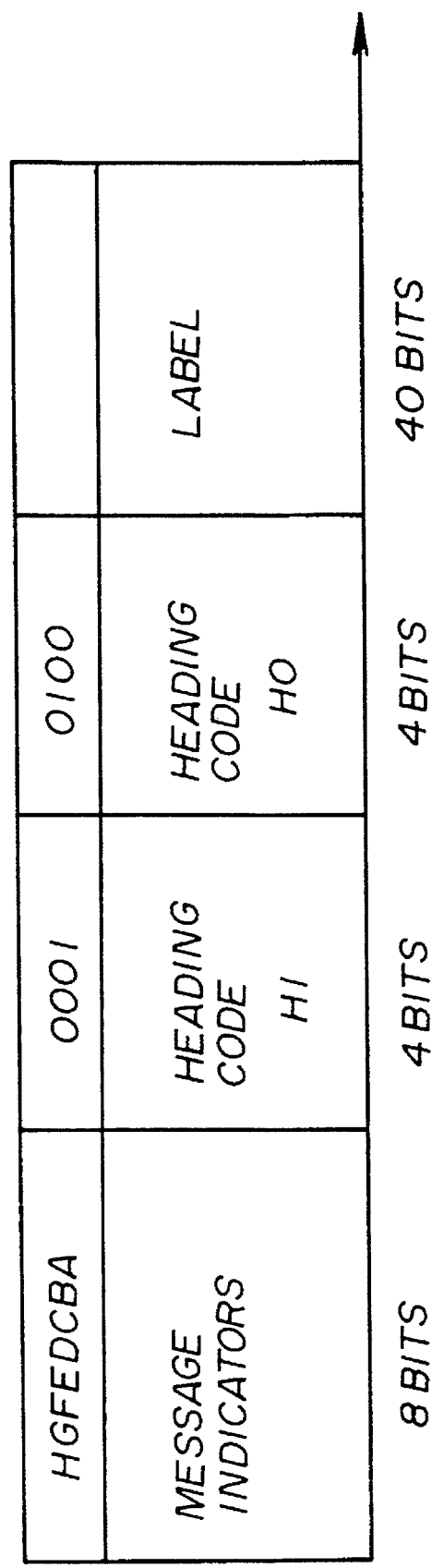
FIG. 9 shows a signal format of a TUP signal as an ACM message.

FIG. 9 shows a signal format of the TUP signal as the ACM message. This TUP signal is constructed with message indicators of 8 bits, a heading code H1 of 4 bits, a heading code H0 of 4 bits, and a label of 40 bits.

The message indicator consists of bit A to bit H, where the bit A to bit E are defined as for an international use, but the bit F to bit H are available for the national use. Therefore, for example, the bit G may be used for the identification flag in the present method.

Figure 10:
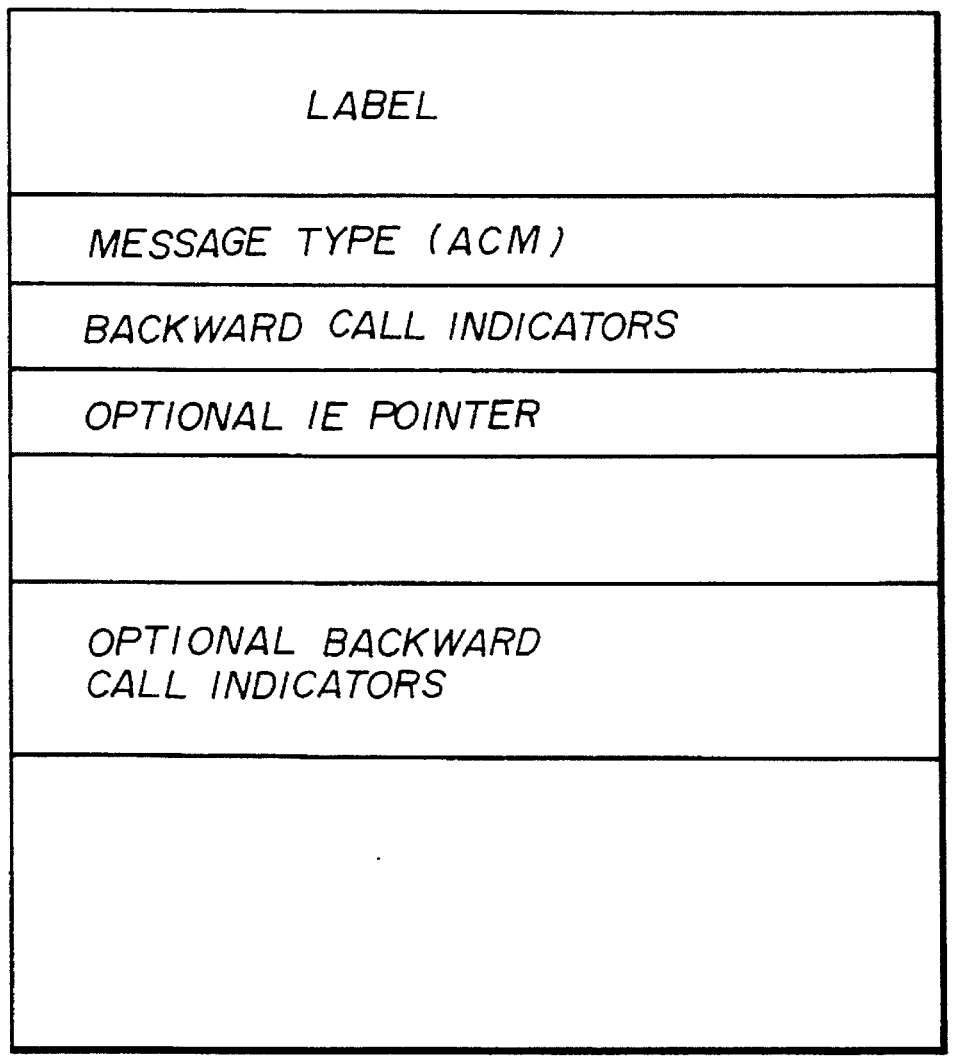
FIG. 10 shows a signal format of an ISUP signal as the ACM message.

FIG. 10 shows a signal format of the ISUP signal as the ACM message. This ISUP signal is constructed with a label, a message type (ACM), backward call indicators, an optional information element pointer (an optional IE pointer), and optional backward call indicators.

The optional backward call indicators consists of 8 bits, bit A to bit H, where the bit A to the bit D are defined as for the international use, but the bit E to bit H are available for the national use. Therefore, for example, the bit E may be used for the identification flag in the present method.

Figure 11A:
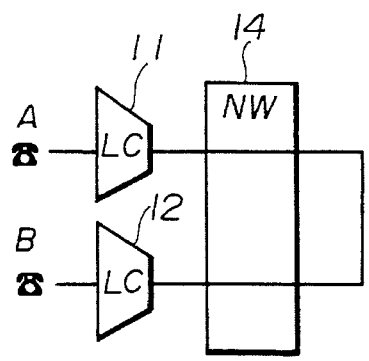
FIGS. 11A to 11C show device constructions for explaining a call-waiting-interruption, where
Figure 11B:
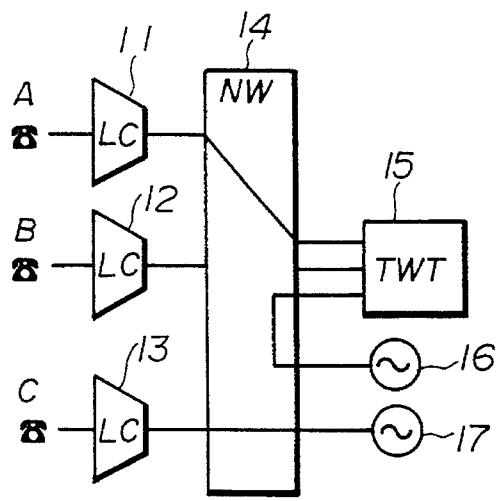
Figure 11C:
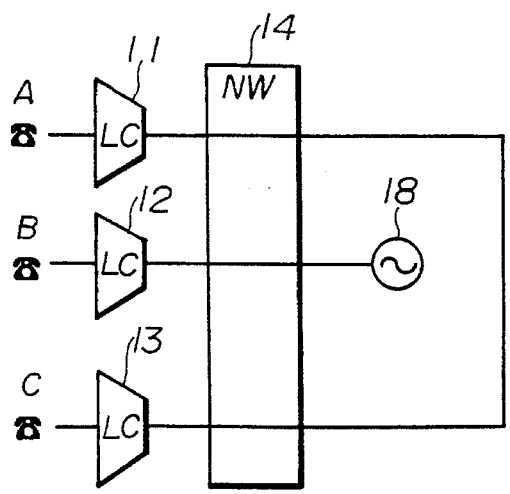

Next, descriptions will be given of device constructions for the method for automatically controlling the call-waiting-interruption restriction, by referring to FIGS. 11A to 11C and FIGS. 12A and 12B. FIGS. 11A to 11C show device constructions for explaining the call-waiting-interruption, where FIG. 11A shows a communicating condition between the subscriber A and the subscriber B, FIG. 11B shows an interrupting condition of the subscriber C to the subscriber A, and FIG. 11C shows a communicating condition between the subscriber A and the subscriber C.

In FIGS. 11A to 11C, the subscribers A, B, and C are connected with a network side 14 (NW: e.g. the switching system) through line concentrators (LC) 11, 12, 13, respectively. The switching system 14 includes a three-way trunk (TWT) 15 for a three-party service, a interruption-beep oscillator 16 for generating an interruption-beep, a ring-back-tone (RBT) oscillator 17, and a holding-tone oscillator 18 for generating a holding tone.

As shown in FIG. 11A, the subscriber A can communicate with the subscriber B by the subscriber A being connected with the subscriber B through the LCs 11, 12 in the NW 14.

When the subscriber C calls the subscriber A, the call-waiting-interruption occurs as follows. First, as shown in FIG. 11B, the subscriber C is connected with the NW 14 through the LC 13, and is connected to the TWT 15 with the subscriber A and the subscriber B. This is a condition of the three-party service. And subsequently, the interruption beep is transmitted from the interruption-beep oscillator 16 to the subscriber A to inform an occurrence of the call-waiting interruption, and the RBT oscillator 17 is connected to the subscriber C to give the ring-back tone.

In this condition, when the subscriber A performs a hook-flash, namely hooks off for merely a short time, as shown in FIG. 11C, the subscriber A is connected with the subscriber C to communicate with the subscriber C, and the subscriber B is connected with the holding-tone oscillator 18 to receive the holding tone.

Figure 12A:
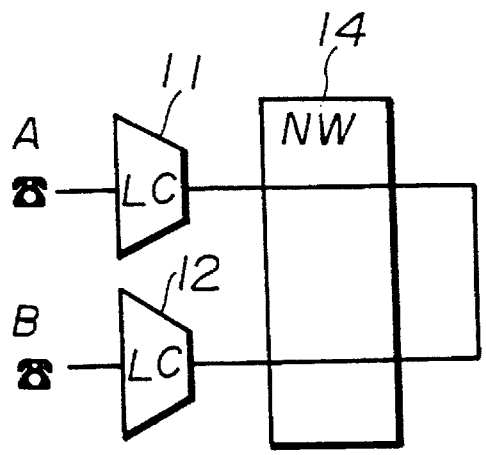
FIGS. 12A and 12B show device constructions for explaining the method for automatically controlling the call-waiting-interruption restriction, where
Figure 12B:
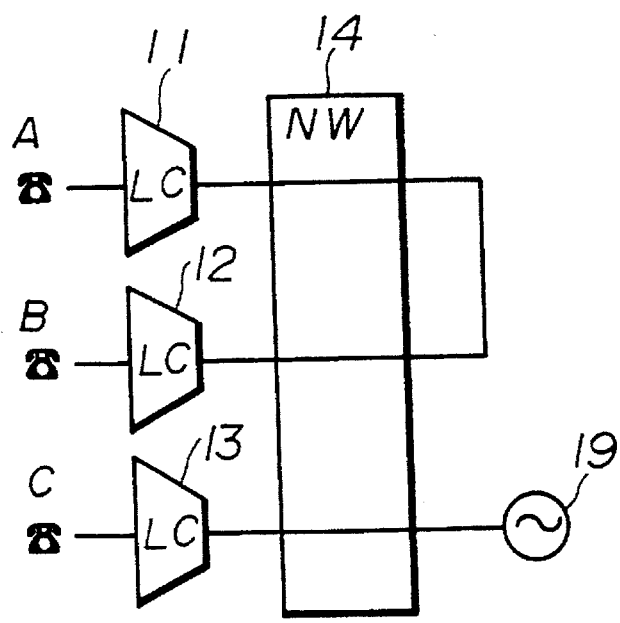

FIGS. 12A and 12B show device constructions for explaining the call-waiting-interruption automatic control, where FIG. 12A shows the communicating condition between the subscriber A and the subscriber B, and FIG. 12B shows the interrupting condition of the subscriber C to the subscriber A. In FIG. 12B, the switching system 14 includes a busy-tone (BT) oscillator 19 for generating the busy tone.

The communicating condition between the subscriber A and the subscriber B in FIG. 12A is the same as that in FIG. 11A. In this condition, when the subscriber C interrupts the subscriber A by calling, the subscriber C is connected with the BT oscillator 19 to receive the busy tone, while the communicating condition between the subscriber A and the subscriber B remains without the interruption. In this way, the call-waiting-interruption is automatically restricted.

Figure 13:
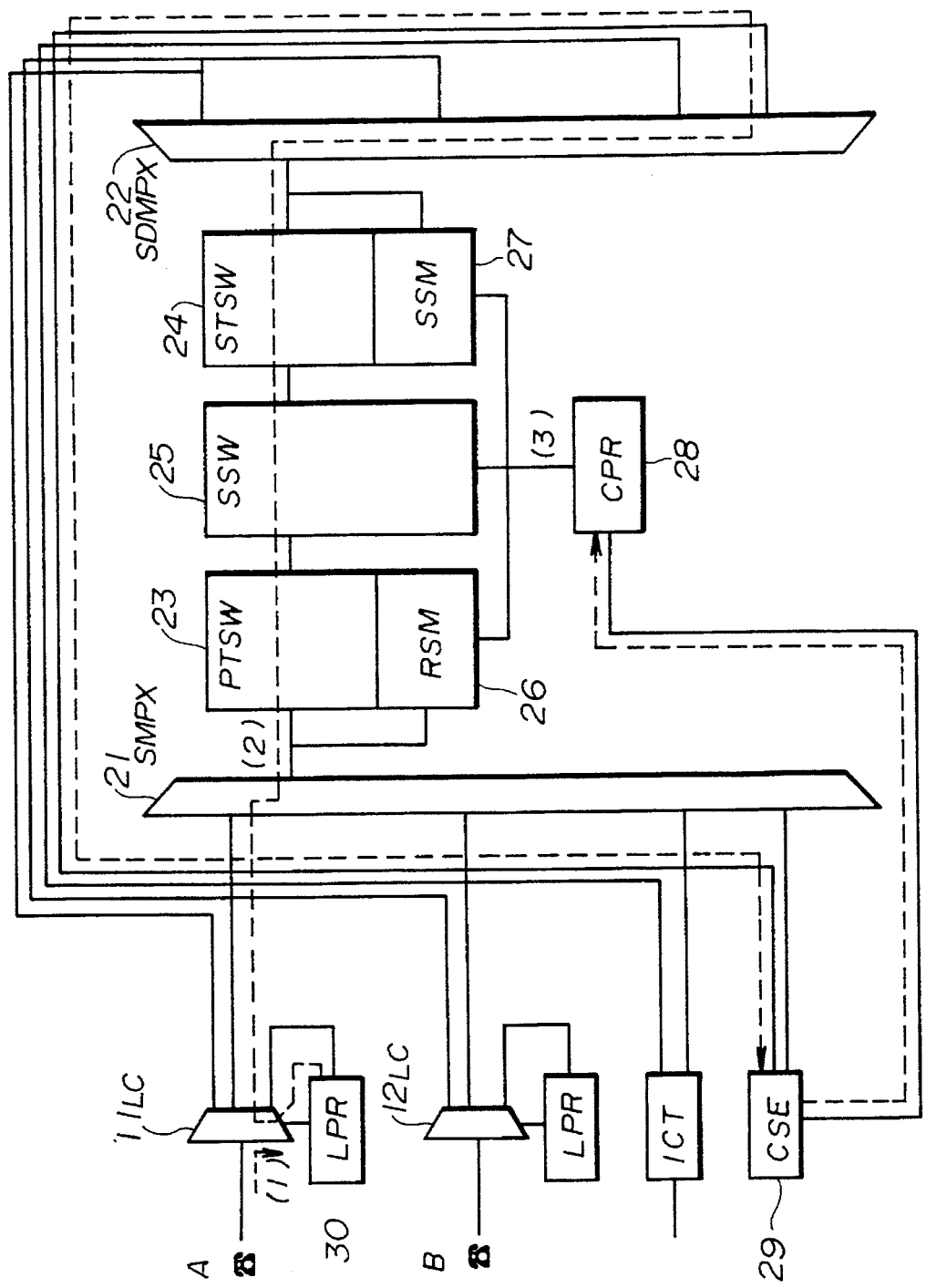
FIG. 13 shows an intra-office connecting condition between subscribers and a switching system.

FIG. 13 shows an intra-office connecting condition between the subscribers and the switching system. The switching system includes a second-order multiplexer (SMPX) 21 for multiplying signals, a second-order demultiplexer (SDMPX) 22 for separating the signals, a post time switch (PTSW) 23, a second time switch (STSW) 24, and a space time switch (SSW) 25, these devices constructing a communication-pass switch.

The switching system further includes a receive-signal memory (RSM) 26 constructed with the PTSW 23, a transmit-signal memory (SSM) 27 constructed with the STSW 24, a call processor (CPR) 28 for controlling the call, a common-channel-signal equipment (CSE) 29 for sending a variety of signals, and a line processor (LPR) 30 for controlling an operation of the LC 11.

After receiving a dial tone, when the subscriber A dials the telephone number of the subscriber B, dial pulses are transmitted to the LPR 30 through the LC 11 as shown in (1) of FIG. 13. The LPR 30 counts the dial pulses, and a dial-number signal corresponding to the dial pulses is transmitted from the CSE 29 to the CPR 28 as shown in (2). As shown in (3), the CPR 28 controls, based on the received dial signal and registered service classes of the subscriber, the PTSW 23, the STSW 24 and the SSW 25 to connect the subscriber A with the subscriber B by performing given connections. In this time, the CSE 29 sends the variety of necessary signals.

Figure 14:
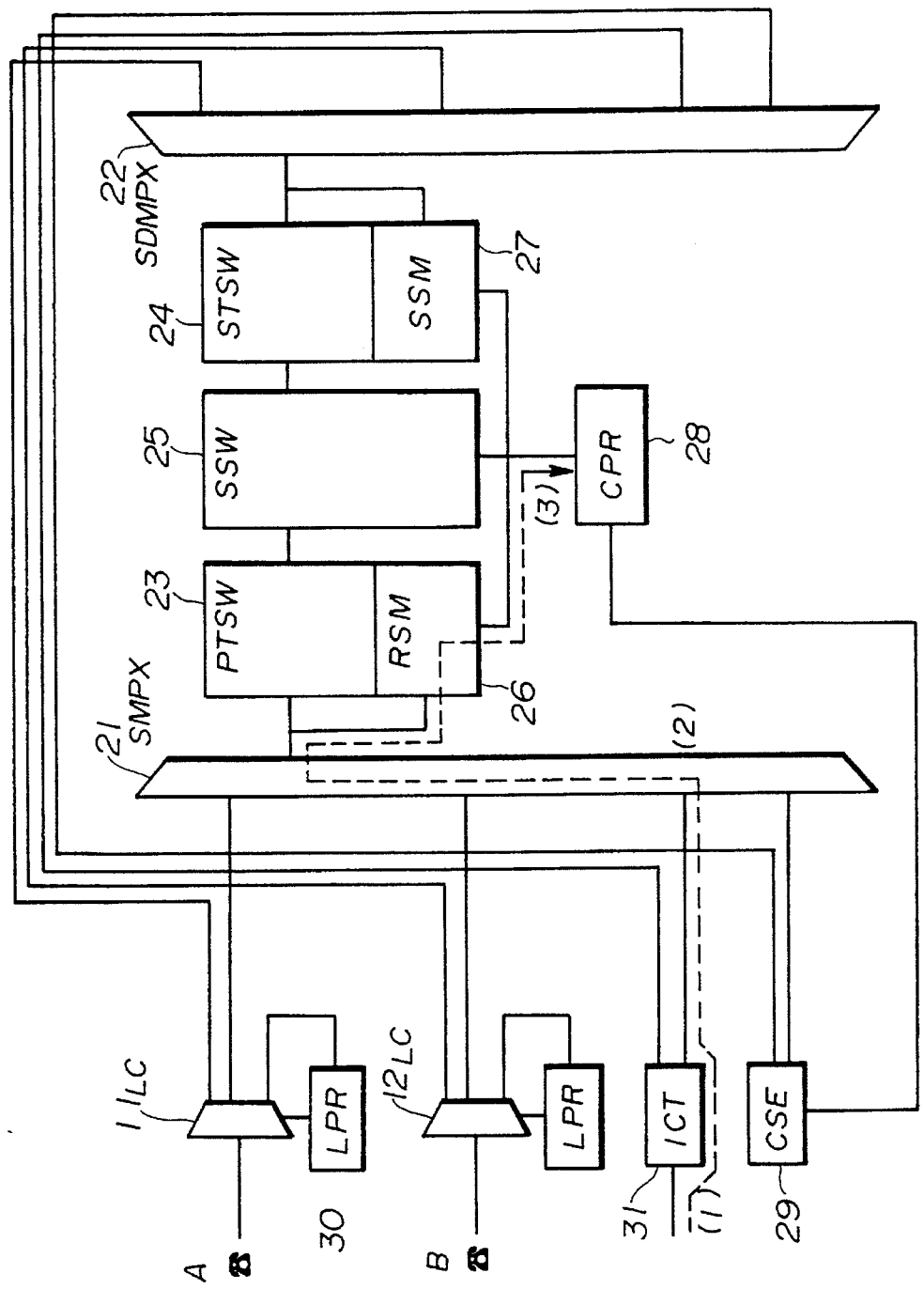
FIG. 14 shows an inter-office connecting condition between the subscriber and the switching system.

FIG. 14 shows an inter-office connecting condition between the subscriber and the switching system. In this drawing, the same reference numerals as these of FIG. 13 are used to indicates corresponding features.

As shown in (1) of FIG. 14, in an incoming trunk (ICT) 31, when the IAM signal or the IAI signal from the other office is detected, the switching system recognizes its detection and prepares itself for receiving the dial signal. Therefore, the dial signal which has been transmitted from the other office is received in the ICT 31. And, the received dial information is transmitted to the CPR 28 through the RSM 26 to be transformed, as shown in (2) and (3).

Figure 15:
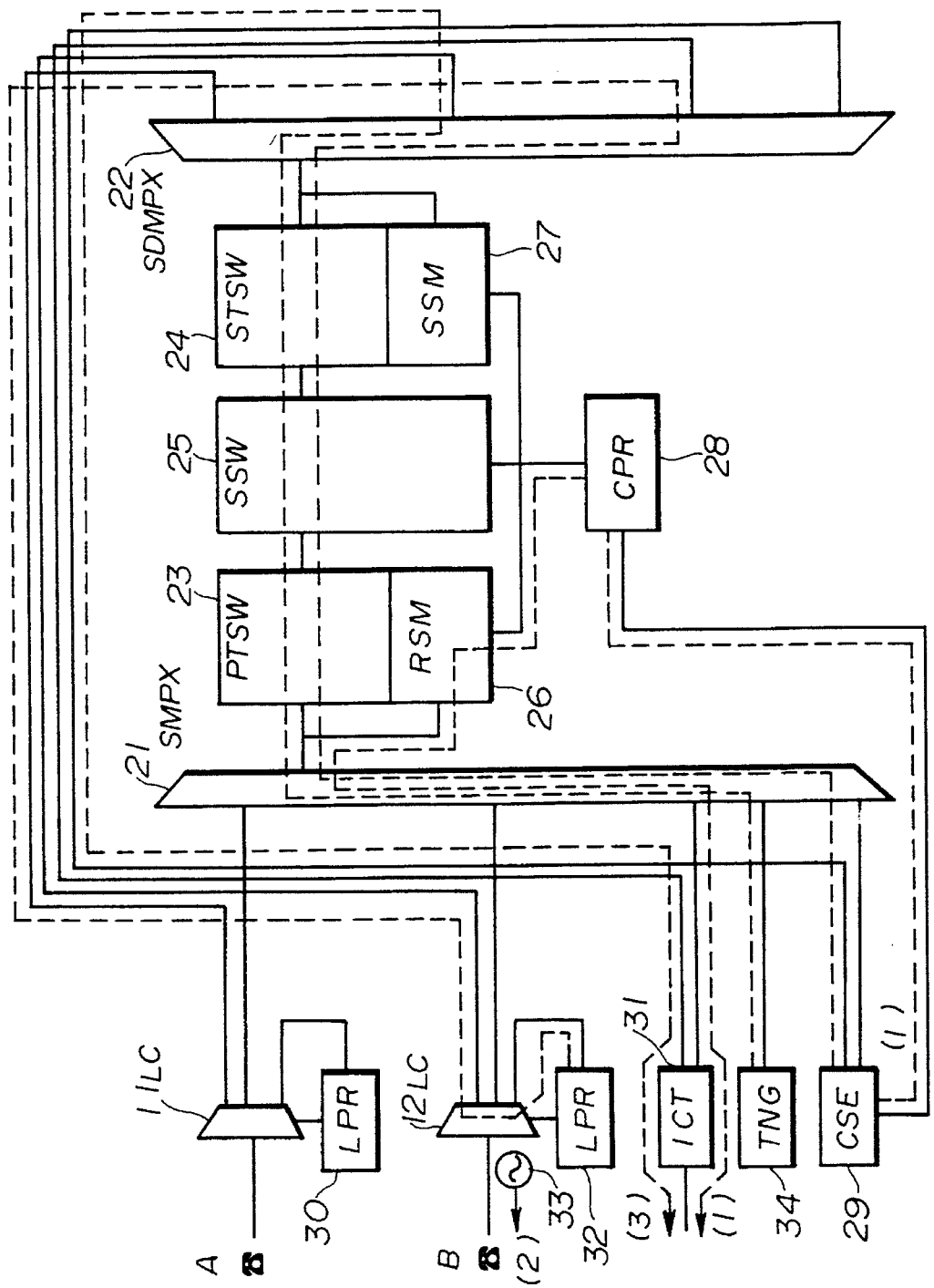
FIG. 15 shows a connecting condition between the subscriber and the switching system at a call connection.

FIG. 15 shows a connecting condition between the subscriber and the switching system at the call connection. In this drawing, the same reference numerals as these of FIG. 13 are used to indicate corresponding features. A line processor (LPR) 32 controls an operation of the LC 12, a ringing device (RG) 33 supplies ringing current, and a tone generator (TNG) 34 generates a tone.

As shown in (1) of FIG. 15, when a last number of the dial signal is received, the CPR 28 decides whether the call is allocated to an intra-connection, an inter-connection, or a specific service, by transforming the dial signal. When the call is allocated to the intra-connection, the CPR 28 sends the call information to the LPR 32 of the subscriber B to terminate. Further, the CPR 28 sends the ACM message to the originating office through the ICT 31, as shown in (1') of FIG. 15.

As shown in (2), the LPR 32 derives the ringing current from the RG 33 to the terminated line, namely the subscriber B, and controls this current. At the same time, the CPR 28 sends the audible ringing tone from the RNG 34 to the originating office through the ICT 31, as shown in (3).

Figure 16:
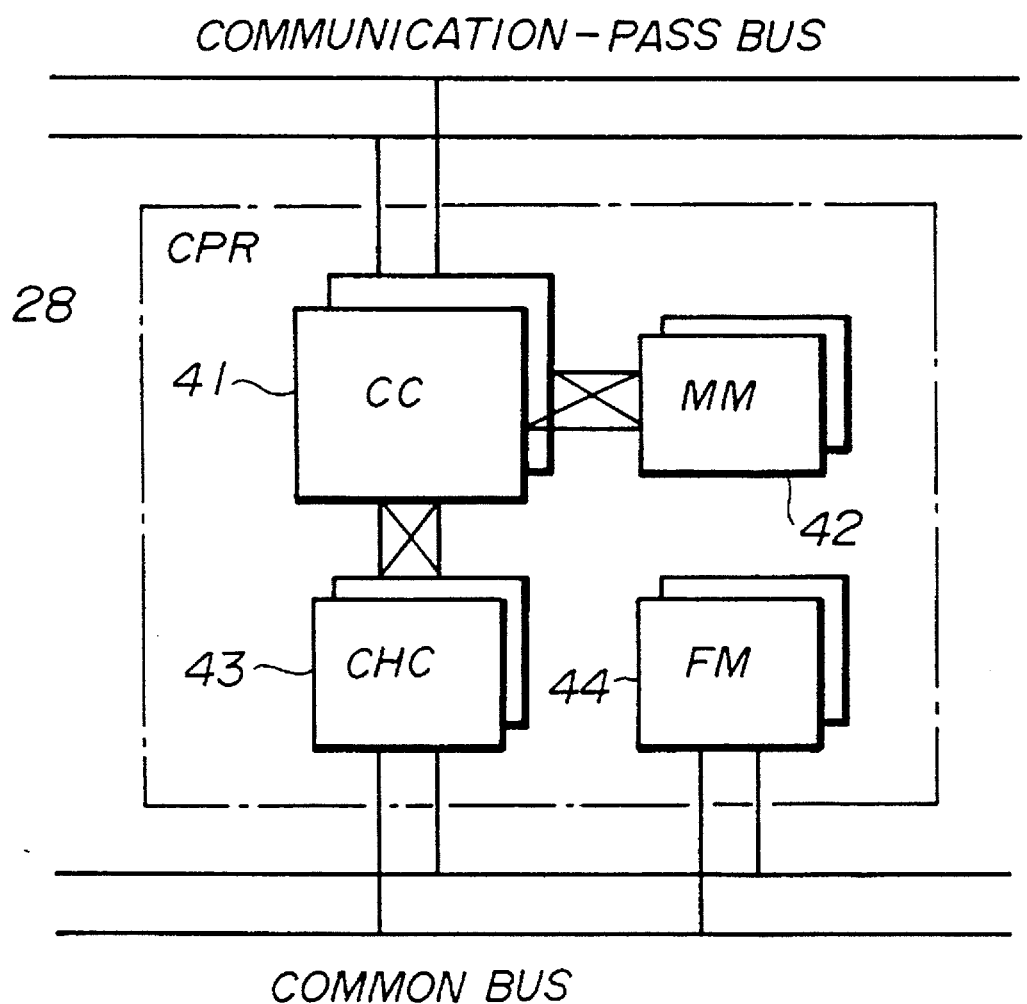
FIG. 16 shows a configuration of a call processor.

FIG. 16 shows a configuration of the call processor 28. The call processor 28 consists of a central controller 41 (CC), a main memory 42 (MM), a channel controller (CHC) 43, and a file memory (FM).

In the CPR 28, the CC 41 generates a call-control information by using the subscriber data which has been read out from the FM 44 through the CHC 43 based on an information from a signal pass (not shown). A generated call-control information is stored in the call-control memory installed in the MM 42.

As described above, the present inventions have the following features.

By supplying the call-waiting-interruption restriction automatic-control service for the one subscriber, even if the other subscriber is supplied with the call-waiting service, the call-waiting interruption to the other subscriber may be restricted. Therefore, the method according to the present invention can prevent the communication data during the data communication such as telematique services from being destroyed due to the beep sound for the interruption call. This advantage makes it possible to effectively utilize both services of the call-waiting service and the data communication service.

According to the present invention, just by setting the flag in the call-control memory, the call-waiting-interruption may be automatically restricted, so that this method can be implemented with a low cost without extending an amount of circuits.

Further, according to the present invention, upon taking the off-hook signal of the terminating subscriber and the originating subscriber, the restriction of the call-waiting-interruption for the subscriber may be performed, so that an operation of the call-waiting-interruption restriction can be automatically started.

Still further, according to the present invention, when the communication is completed, the flag for restricting the call-waiting service is removed, so that the system is automatically lead to the normal condition in which the call-waiting interruption is permitted.

Further, the present invention is not limited to these embodiments, but various variations and modifications may be made without departing from the scope of the present invention.

What is claimed is:

1. A method for automatically controlling a call-waiting service in a communication system, for carrying out an interruption processing for a first subscriber which is in communication with a second subscriber when an interruption call from a third subscriber occurs in the communication system, the method comprising the steps of:

(a) supplying a said call-waiting service to said first and second subscribers;

(b) supplying a call-waiting-interruption restriction service for restricting said call-waiting service even when the interruption call from the third subscriber occurs, to said first subscriber according to a request from the first subscriber; and (c) automatically restricting, when said first and second subscribers are in communication with each other, and when the interruption call from the third subscriber to said second subscriber occurs, said call-waiting service for said second subscriber, wherein:

even the interruption call from the third subscriber to any one of said first and second subscribers occurs, when they are in communication with each other, the call-waiting service is restricted for both the first subscriber and the second subscriber.

2. The method as claimed in claim 1, wherein said method further comprises the steps of:

(d) setting an interruption-restriction flag in an information part for said first subscriber of a call-control memory, and setting the interruption-restriction flag in an information part for said second subscriber of said call-control memory; and (e) referring to the interruption-restriction flag for one of the first and second subscribers to which the interruption call from the third subscriber occurs, and restricting, if the interruption-restriction flag is set, the interruption processing so that the call-waiting service is automatically restricted for the first subscriber and the second subscriber.

3. The method as claimed in claim 2, wherein said steps (d) and (e) are controlled to start in response to reception of an off-hook signal from a terminating side of the first subscriber and the second subscriber.

4. The method as claimed in claim 2, wherein the method further comprises the step of:

(h) erasing, when the communication is completed, said interruption-restriction flag which has been set in the information part for the second subscriber of the call-control memory;

wherein, after erasing the interruption-restriction flag, the call-waiting-interruption for the second subscriber is permitted.

5. The method as claimed in claim 1, wherein said method further comprises the steps of:

(f) setting an interruption-restriction flag in an information part for said first subscriber of a call-control memory within a first office to which the first subscriber belongs; and (g) transmitting information for said call-waiting-interruption restriction service of said first subscriber from said first office to a second office to which the second subscriber belongs by using an address complete message (ACM) of the No. 7 common channel signaling method so that the call-waiting service is automatically restricted for the first subscriber and the second subsciber in another office.

6. The method as claimed in claim 5, wherein said step (g) comprises the steps of:

(g-1) setting an identification flag for indicating an interruption restriction on said ACM in said first office to which the first subscriber belongs, and transmitting the ACM to said second office to which the second subscriber belongs; and (g-2) setting an interruption-restriction flag in an information part for said second subscriber of a call-control memory in the second office based on said identification flag on the ACM transmitted from the first office.

7. The method as claimed in claim 6, wherein said steps (f), (g-2) are controlled to start in response to reception of an off-hook signal from an originating side of the first subscriber and the second subscriber.

8. The method as claimed in claim 6, wherein the method further comprises the step of:

(h) erasing, when the communication is completed, said interruption-restriction flag which has been set in the information part for the second subscriber of the call-control memory in the second office to which the second subscriber belongs;

wherein, after erasing the interruption-restriction flag, the call-waiting-interruption for the second subscriber is permitted.

9. A switching system for making a transmission path between first and second subscribers, said system comprising:

a switch for connecting the first and second subscribers to each other to establish communications therebetween; and a call-processor, connected to said switch, for supplying a call-waiting service for carrying out an interruption processing for the first subscriber which is in communication with the second subscriber when an interruption call from a third subscriber occurs, to said first an second subscribers, for supplying a call-waiting-interruption restriction service for restricting said call-waiting service even when the interruption call from the third subscriber occurs, to said first subscriber according to a request from the first subscriber, and for automatically restricting, when said first and second subscribers are in communication with each other, and when the interruption call from the third subscriber to said second subscriber occurs, said call-waiting service for said second subscriber, wherein even if the interruption call from the third subscriber to any one of said first and second subscribers occurs, when they are in communication with each other, the call-waiting service is restricted for both the first subscriber and the second subscriber.

10. The switching system as claimed in claim 9, wherein:

said system further comprises a call-control memory; and wherein:

said call processor, when making a transmission path between said first subscriber and said second subscriber, sets an interruption-restriction flag in an information part for said first subscriber of the call-control memory and also sets the interruption-restriction flag in an information part for said second subscriber of the call-control memory;

said call process refers to the interruption-restriction flag for one of the to which the interruption call occurs, and restricts, if the interruption-restriction flag is set, the interruption processing so that the call-waiting service is automatically restricted for the first subscriber and the second subscriber.

11. The switching system as claimed in claim 9, wherein:

said system further comprises a call-control memory; and wherein:

the call processor, when making a transmission path between said first subscriber and said second subscriber which belongs to another switching system, sets an interruption-restriction flag in an information part for said first subscriber of the call-control memory;

the call processor transmits information for said call-waiting-interruption restriction service of said first subscriber to the another switching system to which the second subscriber belongs by using an address complete message (ACM) of the No. 7 common channel signaling method in order to set an interruption-restriction flag in an information part for said second subscriber of a call-control memory in said another switching system;

the call processor refers to the interruption-restriction flag for one of the first and second subscribers to which the interruption call occurs, and restricts, if the interruption-restriction flag is set, the interruption processing so that the call-waiting service is automatically restricted for the first subscriber and the second subscriber.

* * * * *